(12) United States Patent
Jansson et al.

(10) Patent No.: US 6,214,967 B1
(45) Date of Patent: Apr. 10, 2001

(54) PROCESS FOR THE POLYMERIZATION OF LACTIDE

(75) Inventors: Kari Jansson, Helsinki; Jukka Koskinen, Espoo; Johan-Fredrik Selin, Helsinki, all of (FI)

(73) Assignee: Fortum Oil and Gas Oy, Espoo (FI)

( * ) Notice: Subject to any disclaimer, the term of this patent is extended or adjusted under 35 U.S.C. 154(b) by 0 days.

(21) Appl. No.: 09/367,382

(22) PCT Filed: Feb. 13, 1998

(86) PCT No.: PCT/FI98/00135

§ 371 Date: Oct. 13, 1999

§ 102(e) Date: Oct. 13, 1999

(87) PCT Pub. No.: WO98/36008

PCT Pub. Date: Aug. 20, 1998

(30) Foreign Application Priority Data

Feb. 14, 1997 (FI) .................................................. 970651

(51) Int. Cl.[7] .................................................. C08G 63/68
(52) U.S. Cl. .................. 528/354; 528/355; 528/502 C; 528/503; 525/413; 525/415; 525/450; 264/66; 264/176.1
(58) Field of Search .................................... 528/354, 355, 528/502 C, 503; 525/413, 415, 450; 264/66, 176.1

(56) References Cited

U.S. PATENT DOCUMENTS

| | | |
|---|---|---|
| 5,378,801 | 1/1995 | Reichert et al. . |
| 5,508,378 | 4/1996 | Ohara et al. . |

FOREIGN PATENT DOCUMENTS

| | | |
|---|---|---|
| 0499747 | 8/1992 | (EP) . |
| 0664309 | 7/1995 | (EP) . |

OTHER PUBLICATIONS

File WPI, Derwent accession No. 97–061868, Shimadzu Corp: "Prepn. of poly:lactic acid for e.g. drug delivery–by ring opening polymerising lactide, removing unreacted lactide and using in polymerisation".

*Primary Examiner*—Duc Truong
(74) *Attorney, Agent, or Firm*—Birch, Stewart, Kolasch & Birch, LLP

(57) ABSTRACT

A two-step process is described for the polymerization of lactide to polylactide, in which process in the first step polymerization is carried out to a conversion of at least 50% by weight, and in the latter step the polylactide is polymerized further to a high conversion in conditions in which the mixing of the melt and the evaporation of the lactide are avoided.

8 Claims, 1 Drawing Sheet

PROCESS FOR THE POLYMERIZATION OF LACTIDE

This application is the national phase under 35 U.S.C. §371 of PCT International Application No. PCT/FI98/00135 which has an International filing date of Feb. 13, 1998 which designated the United States of America.

FIELD OF INVENTION

The invention relates to a two-step polymerization of lactide to polylactide. The invention in particular relates to a process in the second step of which there is carried out polymerization to a high conversion in conditions in which the mixing of the melt and the evaporation of lactide are avoided.

DISCUSSION OF RELATED ART

In recent years, interest in biodegradable polymers, i.e. biopolymers, has greatly increased, and many companies have made efforts to launch on the market packaging materials, hygiene products, sacks and films for agricultural purposes, and sacks for waste. In particular, various films have gained importance. The use of polymers of lactic acid in these applications has so far been limited by the high price of the polymers and their susceptibility to breaking down during technical processing.

Polyhydroxy acids can be prepared by polycondensation reactions, which are typical in the preparation of polyesters, or by ring-opening polymerization from cyclic lactones. Polyhydroxy acids are thermoplastic polyesters which resemble many conventional polymers.

Polylactides, or condensation polymers based on lactic acid, are for many reasons especially attractive, since their principal degradation product, lactic acid, is a product common in nature, it is not toxic and is used widely in the food and pharmaceutical industries. A high molecular weight polymer can best be produced by ring-opening polymerization from lactide Lactic acid is optically active, and thus its dimer appears in four different forms: L,L-lactide; D,D-lactide; L,D-lactide (mesolactide); and a racemic mixture of L,L- and D,D-lactides. By polymerizing these either as pure compounds or at different blend proportions, polymers are obtained which have different stereochemical structures affecting their resilience and crystallinity and, consequently, also their mechanical and thermal properties. The obtained polymers are usually hard and optically bright.

The ring-opening polymerization of cyclic lactones of hydroxy acids, such as lactide, glycolide, epsilon caprolactone, etc., constitutes technology known per se. The polymerization processes known are various, some examples being patent U.S. Pat. No. 5,378,801 relating to extrusion polymerization, patent publication EP 0 664 309-A relating to two-step polymerization, and patent publication EP 0 499 747-A describing polymerization in a mixing reactor.

It is typical of the prior known art that the residual lactide concentration is high, which hampers the processing of the polymer and, on the other hand, its removal causes additional costs.

SUMMARY OF THE INVENTION

It is an object of the invention to find a method for the polymerization of lactide, preferably to a conversion which is close to the theoretical maximum. The polymerization velocity of lactide depends on many factors, such as the initiator used, the initiator concentration, the polymerization temperature, and the lactide concentration.

DETAILED DESCRIPTION OF INVENTION

The polymerization velocity is significantly dependent on the lactide concentration when the lactide concentration is above 30% by weight. Within this range also the viscosity of the polymer-lactide blend at the polymerization temperatures commonly used is relatively low, and thus the polymerization can advantageously be carried out in a stirred reactor at the desired polymerization temperature.

During the development of the process it was observed that an advantageous method of polymerizing to a lactide concentration up to approx. 30% by weight is reactive extrusion polymerization, wherein the monomer and the catalyst are fed continuously into the extruder. The monomer polymerizes rapidly within the lactide concentration and temperature ranges concerned, typically within approx. 2 minutes to a conversion of 30% by weight.

It has now been observed, surprisingly, that, in order to polymerize of lactide to a high conversion and to a low lactide concentration, it is preferable to carry out further polymerization in an apparatus in which the polymer melt is polymerized to as high a degree as possible in conditions in which there occurs no transfer of material. Efforts are made to prevent the evaporation of lactide and the mixing of the lactide melt in the apparatus. The polymerization velocity is sufficiently high and the reaction heat of the polymerization is low, so that the lactide will polymerize to a high conversion in a controlled manner within a short period.

Figure 1:
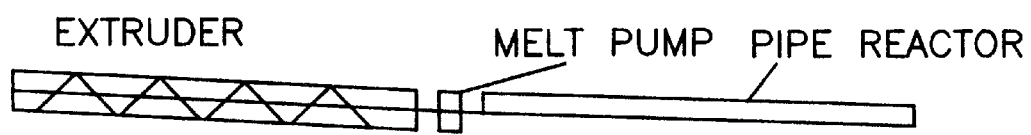
FIG. 1 shows an embodiment of a polymerization apparatus which includes a heated pipe reactor.

According to a preferred embodiment of the invention, the polymerization apparatus used in the second polymerization step is a heated pipe within which the polymer melt travels. The pipe walls are typically heated to a temperature of 180–250° C., and the retention time is 1–10 min. The mixing of the polymer melt in the pipe is very slight. The apparatus according to this embodiment is shown in FIG. 1.

Figure 2:
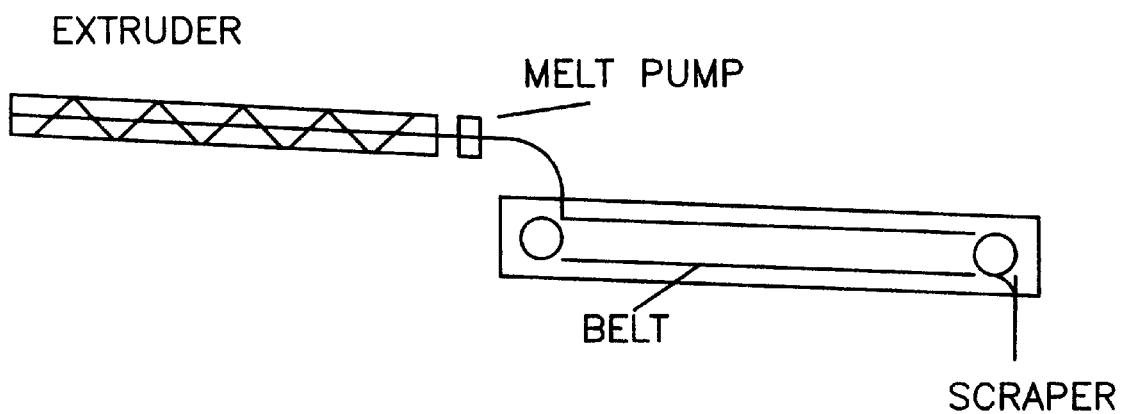
FIG. 2 shows an embodiment of a polymerization apparatus with a heated conveyor belt.

It is also possible to apply in the polymerization other systems with the polymerization conditions of the type described above. Preferred embodiments of other types include a heated conveyor in which the polymer melt is conveyed in a pressurized and heated space on a sheet or a metal belt, from which it is scraped for further processing of the polymer. One typical apparatus of this embodiment is shown in FIG. 2.

The second reactor used in the process according to the invention is highly economical.

Typically the molar mass of the polymer does not rise during the second polymerization step even though the lactide is capable of reacting with the polymers present and the conversion reaches a high level.

The polymer or copolymer according to the present invention can be prepared from L-lactide, D-lactide or D,L-lactide, or blends thereof. Conventional initiators suitable for lactide polymerization, such as various tin and iron compounds, can be used in the polymerization. The molar mass ($M_w$) of the polymer is approximately 20000–500000, preferably 40000–300000. Preferably the polymer is prepared from L-lactide.

The first step of the polymerization can be carried out advantageously by extrusion polymerization. The polymer is produced by heating the monomer or the monomer blend to produce a homogeneous melt and by adding a catalyst in order to polymerize the lactide, whereupon the ring opens. It is also possible advantageously to mix the catalyst and the lactide together while cold and to feed the blend into the extruder.

The invention is described further in greater detail with the help of the following examples.

EXAMPLE 1

A polymer melt polymerized in an extruder to a conversion of approx. 70% by weight, still containing initiator, was fed at a temperature of approx. 200° C. by means of a melt pump into a pipe equipped with a heating jacket and having a length of 2–3 m. The pipe walls were heated by means of an oil jacket to a temperature of approx. 220° C., and the pressure resistance of the pipe was of the order of 1000 bar.

The polymer melt polymerized in the pipe system at a high pressure without the evaporation of the lactide, the melt traveling in the pipe system in laminar flow conditions. The average retention time of the polymerizing lactide melt in the pipe system was approx. 2 min. the concentration of lactide in the polymer being less than 10% by weight.

Prepolymerization was carried out by extrusion polymerization to various lactide concentrations. The results of the second polymerization are compiled in Table 1.

which the polylactide is polymerized further to a high conversion in conditions in which the mixing of the melt and the evaporation of the lactide are avoided, wherein the temperature in the second step is 180–250° C.

2. A process according to claim 1, wherein the second step is conducted in a reactor and the retention time in the reactor is 1–10 min.

3. A process according to claim 1, wherein the second step is conducted in a reactor and the reactor is a pipe equipped with heating, withstanding high pressure.

4. A process according to claim 1, wherein the second step is conducted in a reactor and the reactor is a pressurized and heated polymerization apparatus equipped with a belt conveyor.

5. A process according to claim 1, wherein the polylactide produced in the first step is introduced by an extruder continuously to a reactor for conducting the second step.

6. A process according to claim 2, wherein the polylactide produced in the first step is introduced by an extruder continuously to a reactor for conducting the second step.

7. A process according to claim 3, wherein the polylactide produced in the first step is introduced by an extruder continuously to a reactor for conducting the second step.

TABLE 1

| Feed Lactide concentration wt % | Temperature ° C. | Feed kg/h | Mol weight g/mol | Polymerization Pipe length m | Temperature ° C. | Product Lactide concentration wt % | Mol. weight g/mol |
|---|---|---|---|---|---|---|---|
| 34.3 | 205 | 5 | 146500 | 3 | 220 | 8.0 | 105500 |
| 26.8 | 215 | 5 | 133000 | 3 | 220 | 10.9 | 90900 |
| 43.6 | 215 | 5 | 125200 | 2 | 210 | 10.1 | 118000 |
| 45.6 | 205 | 5 | 157000 | 2 | 220 | 6.4 | 109000 |
| 45.6 | 205 | 5 | 157000 | 2 | 220 | 10.4 | 123000 |
| 36.7 | 215 | 5 | 121500 | 2 | 210 | 9.6 | 109000 |
| 61.9 | 205 | 7 | 96600 | 2 | 220 | 8.6 | 101500 |
| 13.9 | 215 | 5 | 152000 | 2 | 220 | 10.0 | 108500 |
| 13.4 | 215 | 5 | 135500 | 2 | 210 | 5.9 | 113500 |
| 13.1 | 205 | 5 | 171000 | 2 | 210 | 6.8 | 106500 |
| 13.1 | 205 | 5 | 171000 | 2 | 220 | 5.4 | 105500 |
| 22.1 | 215 | 7 | 139500 | 2 | 210 | 8.2 | 105500 |

What is claimed is:

1. A two-step process for the polymerization of a lactide to a polylactide, comprising a first step in which polymerization of a lactide to a polylactide is carried out to aconversion of at least 50% by weight, and a second step in 8. A process according to claim 4, wherein the polylactide produced in the first step is introduced by an extruder continuously to a reactor for conducting the second step.

* * * * *